UNITED STATES PATENT OFFICE.

JOSEPH HAY AMIES, OF PHILADELPHIA, PENNSYLVANIA, ASSIGNOR TO THE AMIES ASPHALT COMPANY, OF PHILADELPHIA, PENNSYLVANIA, A CORPORATION OF SOUTH DAKOTA.

BITUMINOUS CEMENT.

951,471.    Specification of Letters Patent.    Patented Mar. 8, 1910.

No Drawing.    Application filed March 30, 1909. Serial No. 486,804.

*To all whom it may concern:*

Be it known that I, JOSEPH HAY AMIES, a citizen of the United States, residing at Philadelphia, in the county of Philadelphia and State of Pennsylvania, have invented a certain new and useful Improvement in Bituminous Cement, of which the following is a specification.

This invention has reference to a process of making a bituminous or like cement or binder, largely or entirely composed of fluxing elements.

Only a small amount of fluxing elements can ordinarily be used with hard asphalt, or the like, when employed for paving purposes. If a large amount of fluxing elements are used in common practice, the pavements will break down in the heat of summer, while in winter they become so hard as to readily granulate. Such pavements will be slippery and dangerous in winter and dusty and unhealthy in dry weather.

My improvement obviates these faults. I take hard asphalt, or the like, and add thereto from forty to eighty-five per cent. fluxing materials, instead of the five to fifteen per cent. possible to be used in ordinary practice. I then add a sufficient amount of calcium oxid or calcium hydrate to take up and convert the volatile elements of the flux, and thus make a cement that will become tough and leathery. In this way I practically eliminate aging and make my binder or cement indifferent to changes of temperature, or I may dispense entirely with the hard asphalt and the like and only use the fluxing elements. To do this, however, I must use about thirty pounds of calcium oxid or calcium hydrate with seventy pounds of the said oils. If I use less, the pavement will break down in the heat of the sun and if I use more, the oil will be lime-burned.

A satisfactory pavement cannot be made by the ordinary practice without using, as aforesaid, from eighty-five to ninety-five per cent. of hard asphalt or the like.

What I claim is:

1. The process of making a binder and cement for road and street surfacing and resurfacing and like uses, which consists in the employment of about from fifteen to sixty per cent. of solid elements, such as hard asphalt and the like and about forty to eighty-five per cent. of fluxing elements and mixing the same with a sufficient amount of calcium oxid or calcium hydrate, to secure a desirable binder and cement which will be indifferent to changes of temperature and from which aging is practically eliminated.

2. The process of making a binder and cement which consists in the mixing of about seventy per cent. of fluxing elements such as maltha, mineral tar, asphalt oil, mineral and vegetable pitch, and the like, with about thirty per cent. of calcium oxid or calcium hydrate, substantially as and for the purposes set forth.

In testimony whereof I have hereunto signed my name.

JOSEPH HAY AMIES.

Witnesses:
WILLIAM J. JACKSON,
S. F. KOCH.